(12) United States Patent
Alam

(10) Patent No.: US 10,371,522 B2
(45) Date of Patent: Aug. 6, 2019

(54) ITERATIVE ESTIMATION OF CENTRIPETAL ACCELERATIONS OF INERTIAL MEASUREMENT UNITS IN KINEMATIC CHAINS

(71) Applicant: Caterpillar Trimble Control Technologies LLC, Dayton, OH (US)

(72) Inventor: Nima Alam, Liberty Township, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 357 days.

(21) Appl. No.: 15/424,356

(22) Filed: Feb. 3, 2017

(65) Prior Publication Data

US 2018/0224280 A1 Aug. 9, 2018

(51) Int. Cl.
| | |
|---|---|
| *G06F 11/30* | (2006.01) |
| *G01C 19/5776* | (2012.01) |
| *G01P 3/44* | (2006.01) |
| *G01P 15/08* | (2006.01) |
| *G01P 15/18* | (2013.01) |

(52) U.S. Cl.
CPC ........... *G01C 19/5776* (2013.01); *G01P 3/44* (2013.01); *G01P 15/08* (2013.01); *G01P 15/18* (2013.01)

(58) Field of Classification Search
CPC .................................................. G01C 19/5776
See application file for complete search history.

(56) References Cited

U.S. PATENT DOCUMENTS

| | | | | |
|---|---|---|---|---|
| 8,914,196 B1 * | 12/2014 | Breed | ................ | B60R 21/0132 180/271 |
| 9,020,776 B2 * | 4/2015 | Friend | ................... | E02F 3/845 33/365 |
| 9,459,277 B2 * | 10/2016 | Hergesheimer | ......... | G01P 21/00 |

* cited by examiner

*Primary Examiner* — Phuong Huynh
(74) *Attorney, Agent, or Firm* — Kilpatrick Townsend & Stockton LLP

(57) ABSTRACT

A method for determining centripetal accelerations of pivotally coupled rigid bodies arranged in a series, where the series includes a rigid body arranged between a previous rigid body and a next rigid body, includes determining the centripetal acceleration of the next rigid body and the centripetal acceleration at an inertial measurement unit (IMU) coupled to the next rigid body based on measurements and calculated parameters from the rigid body and the next rigid body. The centripetal acceleration of the next rigid body and the centripetal acceleration at the IMU coupled to the next rigid body are determined without using measurements or calculated parameters from the previous rigid body.

20 Claims, 10 Drawing Sheets

Based on a series of pivotally coupled rigid bodies arranged in a series that includes a rigid body arranged between a previous rigid body and a next rigid body, determining centripetal acceleration of the next rigid body and centripetal acceleration of an IMU coupled to the next rigid body without using measurements or calculated parameters from the previous rigid body ⸺ 1102

FIG. 11

ITERATIVE ESTIMATION OF CENTRIPETAL ACCELERATIONS OF INERTIAL MEASUREMENT UNITS IN KINEMATIC CHAINS

FIELD OF THE INVENTION

Embodiments described herein relate generally to estimating centripetal accelerations of inertial measurement units (IMUs), and in some embodiments, in kinematic chains, for example excavators, to improving accuracy of angle calculations between coupled bodies by accounting for the centripetal accelerations.

BACKGROUND

IMUs are sensors that typically use accelerometers and gyroscopes to measure linear and angular motion of an object. IMUs are commonly used in a number of applications where information about object motion is desired. Examples include vehicles, aircraft, and satellites. IMUs are also commonly used to measure motion of different parts of a larger object.

IMUs measure accelerations from gravity and motion. The gravitational acceleration can be used for angle calculations, but the acceleration from motion can degrade the angle calculations. Since it is not always possible to make static measurements, the non-gravitational accelerations (i.e., accelerations from motion of the sensors) can be determined and accounted for to improve accuracy of the angle calculations.

Improved methods of determining non-gravitational accelerations of IMUs are desired.

SUMMARY

Embodiments described herein provide improved methods for determining non-gravitational accelerations, and more particularly, for determining centripetal accelerations of IMUs on rigid bodies that are coupled in kinematic chains. By accounting for the centripetal accelerations, angles between the coupled rigid bodies can be determined with improved accuracy.

In accordance with an embodiment, a method of compensating for centripetal accelerations of IMUs disposed on separate but coupled rigid bodies includes determining a centripetal acceleration of a rigid body at a pivot point between the rigid body and a previous rigid body. The rigid body has an IMU coupled thereto, and the previous rigid body has another IMU coupled thereto. The centripetal acceleration of the rigid body is determined based on an angular velocity of the previous rigid body, an angular acceleration of the previous rigid body, a centripetal acceleration of the previous rigid body, a global angular velocity skew matrix of the previous rigid body, a position of a pivot point between the rigid body and a next rigid body relative to the pivot point between the rigid body and the previous rigid body, and a matrix for rotation between the previous rigid body and the rigid body. The method also includes determining a centripetal acceleration at the IMU of the rigid body. The centripetal acceleration at the IMU of the rigid body is determined based on the centripetal acceleration of the rigid body, a location of the IMU on the rigid body, an angular acceleration of the rigid body, and a global angular velocity skew matrix of the rigid body. The method also includes determining a relative angle between the rigid body and the previous rigid body based on a measured acceleration at the IMU of the rigid body, the centripetal acceleration at the IMU of the rigid body, a measured acceleration at the IMU of the previous rigid body, and a centripetal acceleration at the IMU of the previous rigid body. The method also includes determining a centripetal acceleration of a next rigid body at a pivot point between the next rigid body and the rigid body. The rigid body is arranged between the previous rigid body and the next rigid body. The next rigid body has another IMU coupled thereto. The centripetal acceleration of the next rigid body is determined based on an angular velocity of the rigid body, the angular acceleration of the rigid body, the centripetal acceleration of the rigid body, the global angular velocity skew matrix of the rigid body, a position of the pivot point between the next rigid body and a following rigid body relative to the pivot point between the next rigid body and the rigid body, and a matrix for rotation between the rigid body and the next rigid body. The following rigid body is after the next rigid body in a series. The method also includes determining a centripetal acceleration at the IMU of the next rigid body. The centripetal acceleration at the IMU of the next rigid body is determined based on the centripetal acceleration of the next rigid body, a location of the IMU on the next rigid body, an angular acceleration of the next rigid body, and a global angular velocity skew matrix of the next rigid body. The method also includes determining a relative angle between the next rigid body and the rigid body based on a measured acceleration at the IMU of the next rigid body, the centripetal acceleration at the IMU of the next rigid body, the measured acceleration at the IMU of the rigid body, and the centripetal acceleration at the IMU of the rigid body.

In an embodiment, the centripetal acceleration of the next rigid body and the centripetal acceleration at the IMU of the next rigid body are determined without using the angular velocity of the previous rigid body as an input.

In another embodiment, the centripetal acceleration of the next rigid body and the centripetal acceleration at the IMU of the next rigid body are determined without using measurements from the previous rigid body as inputs.

In another embodiment, the centripetal acceleration of the next rigid body and the centripetal acceleration at the IMU of the next rigid body are determined without using calculated parameters from the previous rigid body as inputs.

In another embodiment, the position of the pivot point between the rigid body and the next rigid body relative to the pivot point between the rigid body and the previous rigid body is a vector extending from the pivot point between the rigid body and the previous rigid body to the pivot point between the rigid body and the next rigid body.

In another embodiment, the location of the IMU on the rigid body is a vector extending from the pivot point between the rigid body and the previous rigid body to the location of the IMU on the rigid body.

In yet another embodiment, the global angular velocity skew matrix of the rigid body is determined based on the matrix for rotation between the previous rigid body and the rigid body, the global angular velocity skew matrix of the previous rigid body, and a local angular velocity skew matrix of the rigid body. The local angular velocity skew matrix of the rigid body may be determined based on a rotation rate of the rigid body around the pivot point between the rigid body and the previous rigid body. The rotation rate of the rigid body around the pivot point between the rigid body and the previous rigid body may be determined based on the angular velocity of rigid body, the matrix for rotation between the previous rigid body and the rigid body, and the angular velocity of the previous rigid body.

In accordance with another embodiment, a method for determining angles between a series of separate but coupled rigid bodies includes determining a centripetal acceleration of a rigid body. The centripetal acceleration of the rigid body is based in part on an angular velocity of a previous rigid body. The previous rigid body is pivotally coupled to the rigid body. A centripetal acceleration is determined at an IMU coupled to the rigid body. The centripetal acceleration at the IMU is based in part on the centripetal acceleration of the rigid body. A relative angle between the rigid body and the previous rigid body is determined based on a measured acceleration at the IMU, the centripetal acceleration at the IMU, a measured acceleration at an IMU coupled to the previous rigid body, and a centripetal acceleration at the IMU coupled to the previous rigid body. A centripetal acceleration of a next rigid body is determined. The centripetal acceleration of the next rigid body is based in part on an angular velocity of the rigid body. The rigid body is pivotally coupled to the next rigid body. A centripetal acceleration at a next IMU coupled to the next rigid body is determined. The centripetal acceleration at the next IMU is based in part on the centripetal acceleration of the next rigid body. The centripetal acceleration of the next rigid body and the centripetal acceleration at the next IMU are determined without using the angular velocity of the previous rigid body as an input. A relative angle between the next rigid body and the rigid body is determined based on a measured acceleration at the next IMU, the centripetal acceleration at the next IMU, a measured acceleration at the IMU coupled to the rigid body, and the centripetal acceleration at the IMU coupled to the rigid body.

In an embodiment, the centripetal acceleration of the next rigid body and the centripetal acceleration at the next IMU are determined without using measurements from the previous rigid body as inputs.

In another embodiment, the centripetal acceleration of the next rigid body and the centripetal acceleration at the next IMU are determined without using calculated parameters from the previous rigid body as inputs.

In another embodiment, the centripetal acceleration of the next rigid body is also based on an angular acceleration of the rigid body, the centripetal acceleration of the rigid body, a global angular velocity skew matrix of the rigid body, a position of the pivot point between the next rigid body and a following rigid body relative to the pivot point between the next rigid body and the rigid body, and a matrix for rotation between the rigid body and the next rigid body.

In yet another embodiment, the centripetal acceleration at the next IMU coupled to the next rigid body is also based on the centripetal acceleration of the next rigid body, a location of the next IMU on the next rigid body, an angular acceleration of the next rigid body, and a global angular velocity skew matrix of the next rigid body.

In accordance with yet another embodiment, a method for determining centripetal accelerations of pivotally coupled rigid bodies arranged in a series, where the series includes a rigid body arranged between a previous rigid body and a next rigid body, includes determining the centripetal acceleration of the next rigid body and the centripetal acceleration at an IMU coupled to the next rigid body based on measurements and calculated parameters from the rigid body and the next rigid body. The centripetal acceleration of the next rigid body and the centripetal acceleration at the IMU coupled to the next rigid body are determined without using measurements or calculated parameters from the previous rigid body.

In an embodiment, the centripetal acceleration of the next rigid body is determined based on an angular velocity of the rigid body, an angular acceleration of the rigid body, a centripetal acceleration of the rigid body, a global angular velocity skew matrix of the rigid body, a position of the pivot point between the next rigid body and a following rigid body relative to the pivot point between the next rigid body and the rigid body, and a matrix for rotation between the rigid body and the next rigid body.

In another embodiment, the centripetal acceleration at the IMU coupled to the next rigid body is determined based on the centripetal acceleration of the next rigid body, a location of the IMU on the next rigid body, an angular acceleration of the next rigid body, and a global angular velocity skew matrix of the next rigid body.

In another embodiment, the method also includes determining a relative angle between the next rigid body and the rigid body based at least in part of the centripetal acceleration at the next IMU.

In another embodiment, the method also includes determining the centripetal acceleration of the rigid body and the centripetal acceleration at an IMU coupled to the rigid body based on measurements and calculated parameters from the previous rigid body and the rigid body. The centripetal acceleration of the rigid body and the centripetal acceleration at the IMU coupled to the rigid body are determined without using measurements or calculated parameters from rigid bodies before the previous rigid body in the series.

In accordance with yet another embodiment, a method for determining angles between pivotally coupled rigid bodies arranged in a series, where the series includes a rigid body arranged between a previous rigid body and a next rigid body, includes determining a centripetal acceleration of the rigid body and a centripetal acceleration at an IMU coupled to the rigid body. A relative angle between the rigid body and the previous rigid body is determined based on a measured acceleration at the IMU, the centripetal acceleration at the IMU, a measured acceleration at an IMU coupled to the previous rigid body, and a centripetal acceleration at the IMU coupled to the previous rigid body. The centripetal acceleration of the next rigid body and the centripetal acceleration at an IMU coupled to the next rigid body are determined. A relative angle between the next rigid body and the rigid body is determined based on a measured acceleration at the IMU coupled to the next rigid body, the centripetal acceleration at the IMU coupled to the next rigid body, a measured acceleration at the IMU coupled to the rigid body, and a centripetal acceleration at the IMU coupled to the rigid body.

Numerous benefits are achieved using embodiments described herein over conventional techniques. For example, some embodiments determine centripetal acceleration of an IMU based on measurements and calculated parameters from a rigid body and an immediately prior rigid body in a series without requiring information from earlier rigid bodies in the series. This simplifies the calculation of centripetal accelerations of IMUs on coupled bodies. Other embodiments use measured and calculated centripetal accelerations of IMUs to determine relative angles between rigid bodies. Accounting for the centripetal accelerations can improve accuracy of angle measurements. Depending on the embodiment, one or more of these benefits may exist. These and other benefits are described throughout the specification with reference to the appended drawings.

BRIEF DESCRIPTION OF THE DRAWINGS

FIG. 11 is a flowchart illustrating a method of determining angles between pivotally coupled rigid bodies arranged in a series in accordance with some embodiments.

DETAILED DESCRIPTION

Embodiments described herein provide improved methods of determining centripetal accelerations of IMUs on rigid bodies in a kinematic chain. In some embodiments, for example, centripetal acceleration of an IMU on a rigid body can be determined based on measurements and calculated parameters from the rigid body and an immediately prior rigid body in a series without requiring information from earlier rigid bodies in the series. The centripetal accelerations can be used to determine angles between the rigid bodies.

An example of a series of rigid bodies in a kinematic chain that will be used throughout this application is an excavator that includes a number of movable parts (or bodies) that are pivotally coupled together. It should be appreciated that an excavator is used merely as an example, and the embodiments described herein may be used with any other heavy equipment, vehicle, machinery, or kinematic chain that includes rigid bodies coupled in series.

Figure 1:
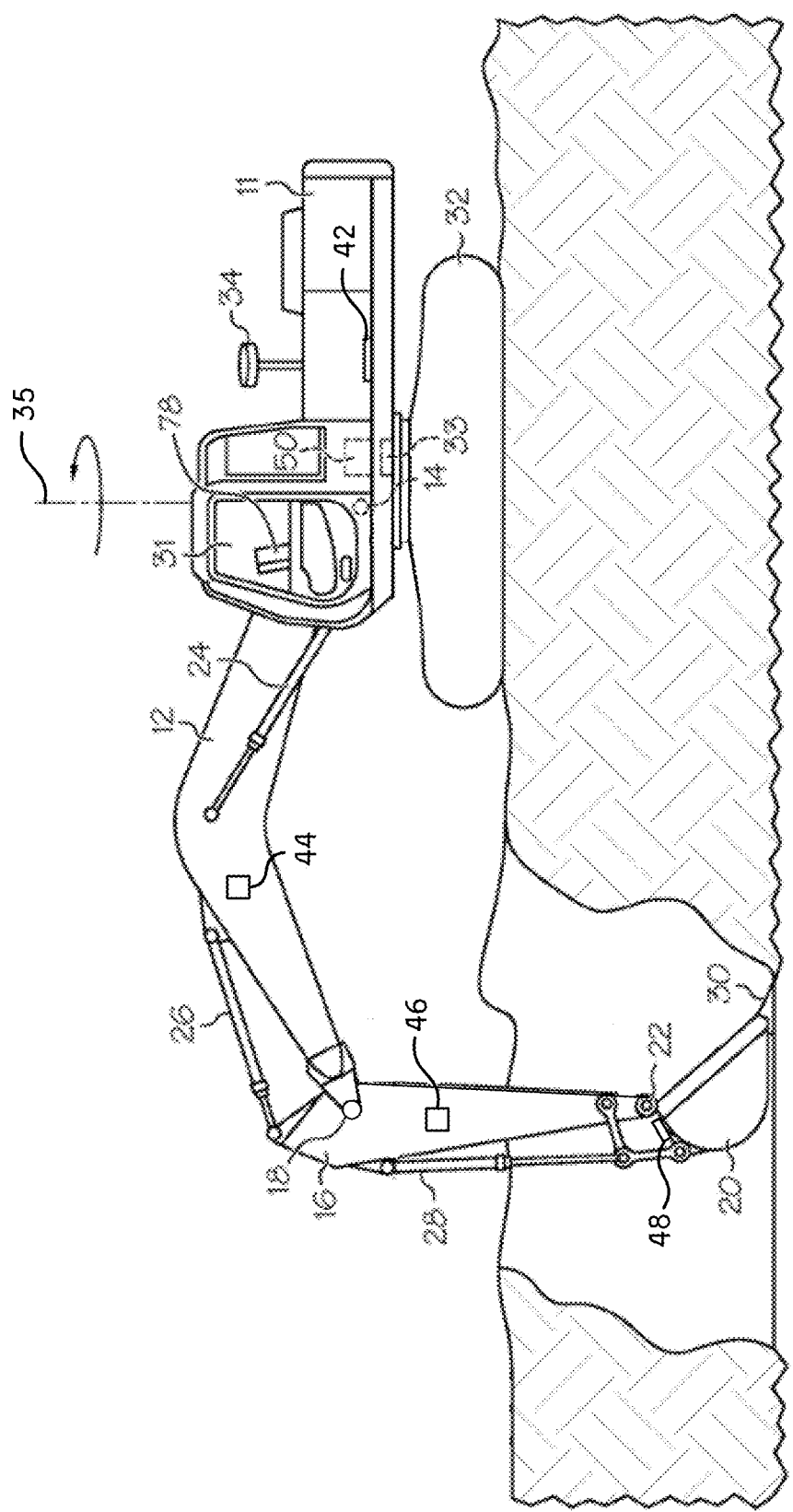
FIG. 1 is a simplified side view of an excavator (an example of a kinematic chain)

FIG. 1 is a simplified side view of an excavator that includes a platform 11, a boom 12, a stick 16, and a bucket 20. The boom 12 is pivotally coupled to the platform 11 at a pivot point 14, the stick 16 is pivotally coupled to the boom 12 at a pivot point 18, and the bucket 20 is pivotally coupled to the stick 16 at a pivot point 22. Hydraulic devices 24, 26, 28 are provided to move the boom 12, the stick 16, and the bucket 20. The bucket 20 includes teeth 30 that may assist in digging. The platform 11 includes a cab 31 supported on an undercarriage 32 that may include wheels or tracks to facilitate movement of the excavator over a worksite. The platform 11 can be rotated about a generally vertical axis 35 by a hydraulic motor 33. It should be appreciated that although this example includes a one-piece boom, embodiments described herein can be utilized with excavators having variable angle booms. Further, the excavator can be used with other implements or tools besides the bucket 20 such as augers, trenchers, compactors, and the like.

Excavators commonly utilize a variety of sensors to monitor positions of various machine elements and/or to provide a display of the element positions to an operator. As an example, angles between the platform 11, the boom 12, the stick 16, and the bucket 20 can be determined using encoders; sensors associated with pivot points 14, 18, 22; string encoders associated with hydraulic devices 24, 26, 28; and/or other sensors. Alternatively, angles of the bodies can be determined relative to gravity using inclinometers such as IMUs. In the example of FIG. 1, the excavator includes an IMU 42 on the platform 11, an IMU 44 on the boom 12, an IMU 46 on the stick 16, and an IMU 48 on the bucket 20. These IMUs can be used to determine angles of the bodies relative to gravity. The IMUs may operate in one or multiple axes.

Movement of some of the parts or bodies of the excavator can cause movement of other parts. For example, rotation of the platform 11 about the axis 35 causes non-gravitational acceleration of each of the IMUs 42, 44, 46, 48; movement of the boom causes non-gravitational acceleration of the IMUs on the boom 12, the stick 16, and the bucket 20; and movement of the stick causes non-gravitational acceleration of IMUs on the stick 16 and the bucket 20. These non-gravitational accelerations degrade the angle measurements by the IMUs that are based on gravitational acceleration.

The excavator in this example includes a controller 50 having an associated memory. The controller 50 is responsive to the IMUs for determining a position of the bucket 20 and/or teeth 30 based on the angles of the bodies. The position can be determined relative to the platform 11 or a point on the platform 11, or the platform 11 may include a position sensor, such as Global Navigation Satellite System (GNSS) positioning system 34, that allows the position to be determined in another coordinate frame.

The controller 50 may also determine a difference between the position of the bucket 20 and a desired elevation at a digging point on the worksite. The desired elevation may be determined from a desired topology that is stored in the memory. An operator may control movement of the excavator using controls in the cab 31 and/or the controller 50 may provide automated machine control. A display 78 in the cab 31 may assist the operator by showing a current position of the bucket 20 and a desired elevation. The automated machine control may move the parts or bodies based on the position of the bucket 20 and/or teeth 30 relative to the desired elevation.

Figure 2:
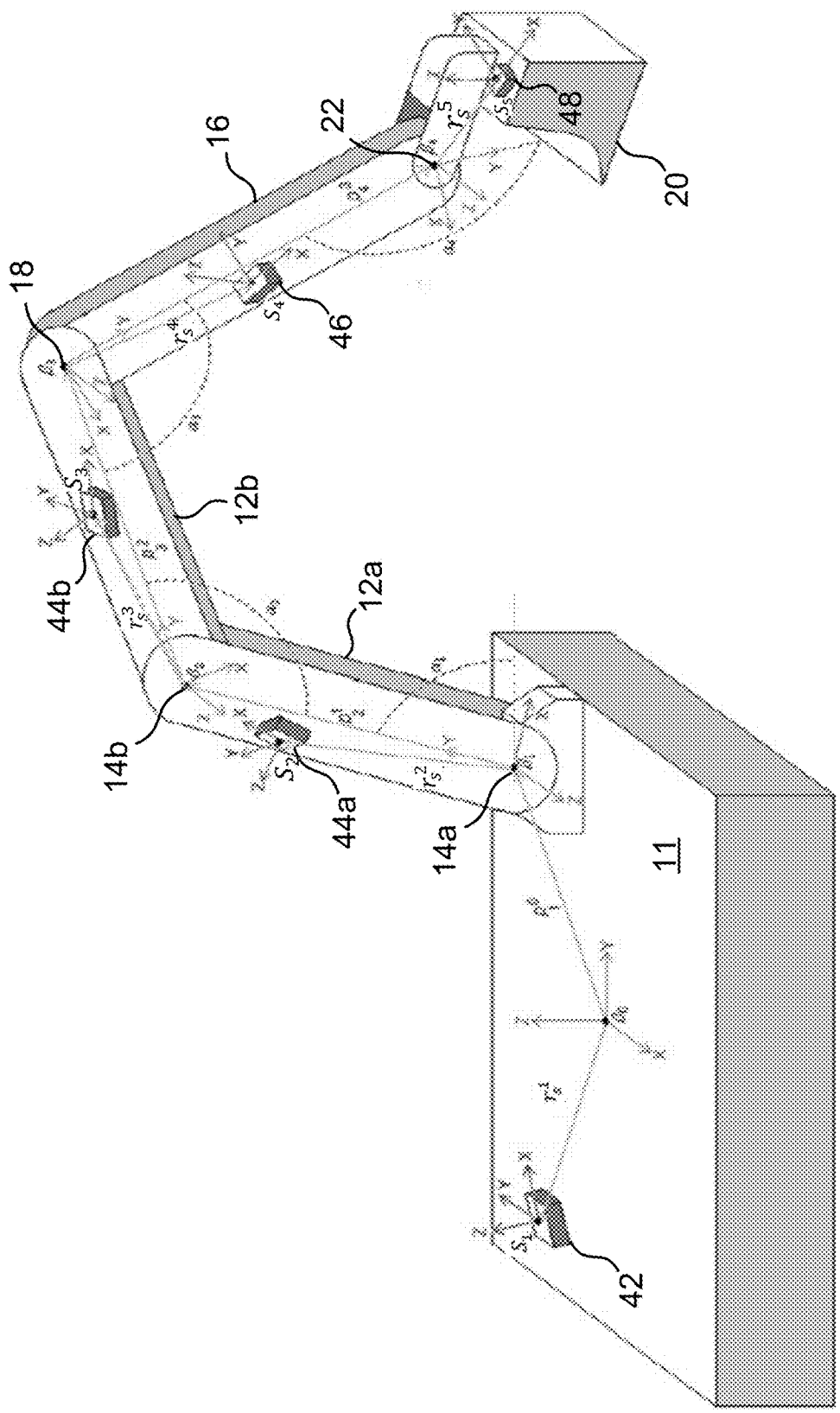
FIG. 2 is a simplified block diagram showing various elements of an excavator in accordance with some embodiments.

FIG. 2 is a simplified block diagram showing various elements of an excavator in accordance with an embodiment. Although only a block diagram, this excavator is similar to that shown in FIG. 1, except it includes a variable angle boom with a first section 12a and a second section 12b each having an IMU 44a, 44b respectively. This figure illustrates some of the variables that may be used to determine centripetal accelerations in some of the embodiments described herein.

All the IMUs 42, 44a, 44b, 46, 48 in this figure are shown with their respective coordinate system. Each IMU has a z-axis extending normal to a top surface, and x- and y-axes extending parallel to the top surface in orthogonal directions. Any measurements by the IMUs are relative to their coordinate system.

Each of the parts or bodies of the excavator are rigid and coupled in series. This figure shows pivot points between each of the rigid bodies. The first section 12a of the boom is pivotally coupled to a platform 11 at a pivot point 14a, the second section 12b of the boom is pivotally coupled to the first section 12a of the boom at a pivot point 14b, a stick 16 is pivotally coupled to the second section 12b of the boom at a pivot point 18, and a bucket 20 is pivotally coupled to the stick 16 at a pivot point 22. Embodiments described herein can be applied to other objects having more or fewer bodies coupled in series.

For each of the rigid bodies that are coupled between a previous rigid body and a next rigid body (i.e., the first section 12a of the boom, the second section 12b of the boom, and the stick 16), this figure shows a vector extending from a pivot point between the rigid body and the previous rigid body to a pivot point between the rigid body and the next rigid body. This vector defines a position of the pivot point between the rigid body and the next rigid body relative to the pivot point between the rigid body and the previous rigid body. This is represented by the symbol $p_n^{n-1}$, where n is a position (or number) of the rigid body in the series. For example, the platform is first in the series, the first section 12a of the boom is second in the series, the second section 12b of the boom is third in the series, the stick 16 is fourth in the series, and the bucket 20 is fifth in the series. For the platform 11 (the first rigid body in the series), $p_1^0$ is a vector extending from an axis of rotation or center of rotation $\beta_0$ of the platform 11 to the pivot point 14a.

For each of the rigid bodies that are coupled to a previous rigid body (i.e., the first section 12a of the boom, the second section 12b of the boom, the stick 16, and the bucket 20), this figure also shows a vector extending from a pivot point between the rigid body and the previous rigid body to a position of an associated IMU. This vector defines a location of the IMU on the rigid body. This is represented by the symbol $r_s^n$, where once again n is a position (or number) of the rigid body in the series. The subscripts, representing "sensor", is used as part of the naming convention since the vector extends from the pivot point to a position of the IMU ($S_n$). For the platform 11 (the first rigid body in the series), $r_s^1$ represents a vector extending from the axis of rotation or center of rotation $\beta_0$ of the platform 11 to a position $S_1$ of the IMU 42. In some embodiments, the position ($S_n$) of an $IMU_n$ may be a center of rotation or a center of measurement of the IMU.

Figure 3:
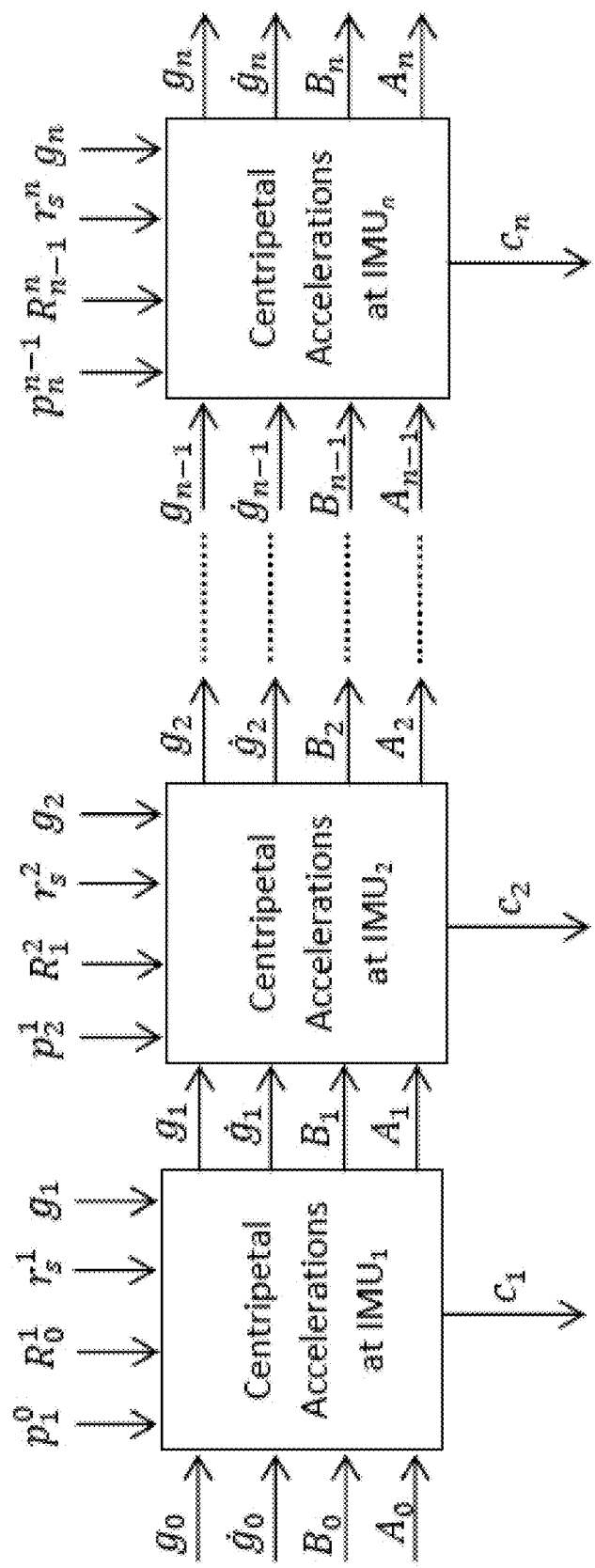
FIG. 3 is a flowchart illustrating methods of determining centripetal accelerations of IMUs in accordance with some embodiments.

FIG. 3 is a flowchart illustrating methods of determining centripetal accelerations of IMUs in accordance with an embodiment. This figure has three boxes representing the calculation of centripetal accelerations at $IMU_1$, $IMU_2$, and $IMU_n$ mounted on a kinematic chain. Although not specifically shown, each of the IMUs are coupled to rigid bodies, where the rigid bodies are arranged in a series similar to the examples shown in FIGS. 1-2.

Each of the boxes in FIG. 3 has a number of inputs that are used to the calculate centripetal acceleration at the IMU. The inputs are represented by arrows pointing inward toward the box. The inputs shown on the left of each box are those that are associated with a previous rigid body in the series. The inputs shown on the top of each box are those that are associated with a current rigid body.

Outputs are represented by arrows pointing away from the box. The outputs shown on the right of each box are values that are passed from the current rigid body to a next rigid body in the series. The output shown on the bottom of each box is the centripetal acceleration at the IMU.

For each IMU (except the IMU coupled to the first rigid body in the series), the inputs associated with a previous rigid body are:

$g_{n-1}$ is an angular velocity of the previous rigid body;
$\dot{g}_{n-1}$ is an angular acceleration of the previous rigid body;
$B_{n-1}$ is a centripetal acceleration of the previous rigid body; and
$A_{n-1}$ is a global angular velocity skew matrix of the previous rigid body.

For each IMU (except the IMU coupled to the first rigid body in the series), the inputs associated with the current rigid body are:

$p_n^{n-1}$ is a position of the pivot point between the current rigid body and the next rigid body relative to the pivot point between the current rigid body and the previous rigid body (see FIG. 2);
$R_{n-1}^n$ is a matrix for rotation between the previous rigid body and the current rigid body;
$r_s^n$ is a sensor (IMU) location on the current rigid body (see FIG. 2); and
$g_n$ is an angular velocity of the current rigid body.

The outputs that are passed from the current rigid body to the next rigid body are:

$g_n$ is an angular velocity of the current rigid body;
$\dot{g}_n$ is an angular acceleration of the current rigid body;
$B_n$ is a centripetal acceleration of the current rigid body; and
$A_n$ is a global angular velocity skew matrix of the current rigid body.

The centripetal acceleration at the $IMU_n$ of the current rigid body (i.e., rigid body n) is represented by the variable $c_n$. The centripetal acceleration at the $IMU_n$ can be used as one of the inputs to determine an angle of the rigid body n. As shown in this example, the centripetal acceleration at the $IMU_n$ can be determined based on measurements and calculated parameters from the rigid body n and the previous rigid body without requiring information from earlier rigid bodies in the series. The previous rigid body is the immediately prior rigid body in the series, and the next rigid body is the immediately following rigid body in the series.

Figure 4:
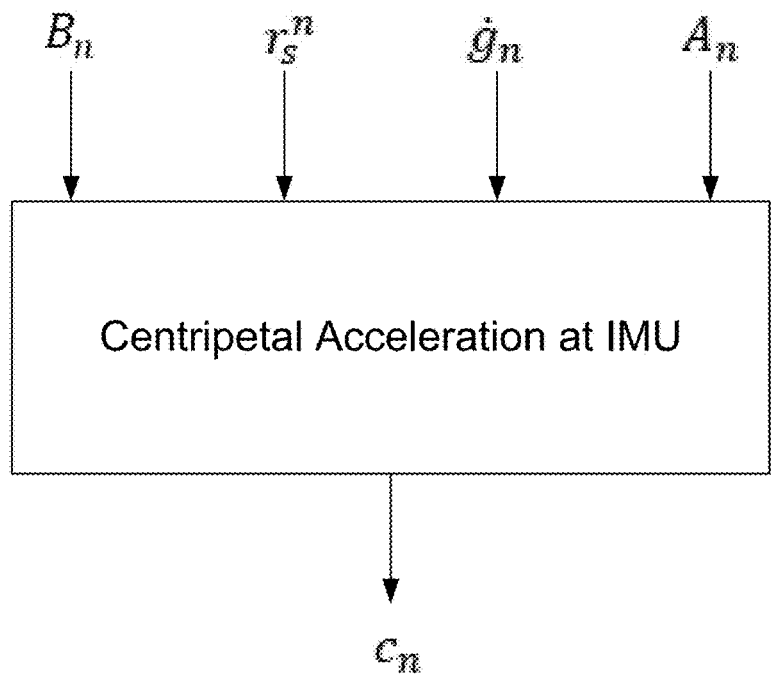
FIG. 4 is a flowchart illustrating a method of determining centripetal acceleration at an IMU in accordance with an embodiment.

In some embodiments, the centripetal acceleration ($c_n$) at an $IMU_n$ that is coupled to a rigid body n is calculated based on (i) a centripetal acceleration of the rigid body ($B_n$); (ii) a location of the $IMU_n$ on the rigid body ($r_s^n$); (iii) an angular acceleration of the rigid body ($\dot{g}_n$); and an angular velocity skew matrix of the rigid body ($A_n$). This is shown in FIG. 4. Once again the centripetal acceleration at the $IMU_n$ is determined based on measurements and calculated parameters from the rigid body n and the previous rigid body without requiring information from earlier rigid bodies in the series.

In particular embodiments, the centripetal acceleration at the $IMU_n$ may be calculated using the following equation:

$$c_n = A_n r_s^n + B_n + g_n \times r_s^n \qquad \text{Equation (1)}$$

Figure 5:
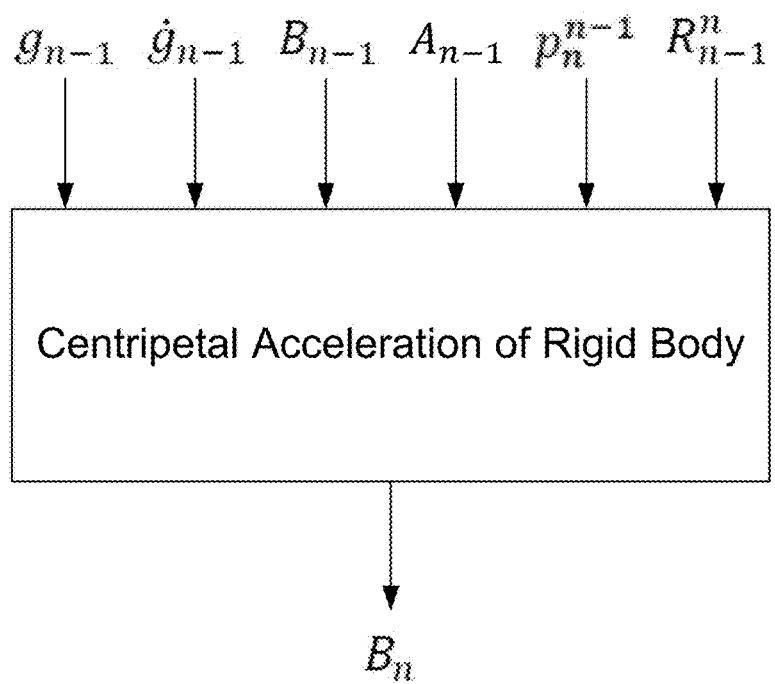
FIG. 5 is a flowchart illustrating a method of determining centripetal acceleration of a rigid body in accordance with an embodiment.

FIG. 5 is a flowchart illustrating a method of determining centripetal acceleration ($B_n$) of a rigid body n in accordance with an embodiment. The centripetal acceleration of the rigid body n may be used in Equation (1) to determine the centripetal acceleration at the $IMU_n$. As shown in FIG. 5, the centripetal acceleration ($B_n$) of the rigid body n may be determined based on (i) an angular velocity of the previous rigid body ($g_{n-1}$); (ii) an angular acceleration of the previous rigid body ($\dot{g}_{n-1}$); (iii) a centripetal acceleration of the previous rigid body ($B_{n-1}$); (iv) a global angular velocity skew matrix of the previous rigid body ($A_{n-1}$); (v) a position of a pivot point between the rigid body n and the next rigid body relative to the pivot point between the rigid body n and the previous rigid body ($p_n^{n-1}$); and (vi) a matrix for rotation between the previous rigid body and the rigid body ($R_n^{n-1}$).

In particular embodiments, the centripetal acceleration at the rigid body n may be calculated using the following equation:

$$B_n = (R_{n-1}^n)^T [B_{n-1} + \dot{g}_{n-1} \times p_n^{n-1} + A_{n-1} p_n^{n-1}] \quad \text{Equation (2)}$$

Figure 6:
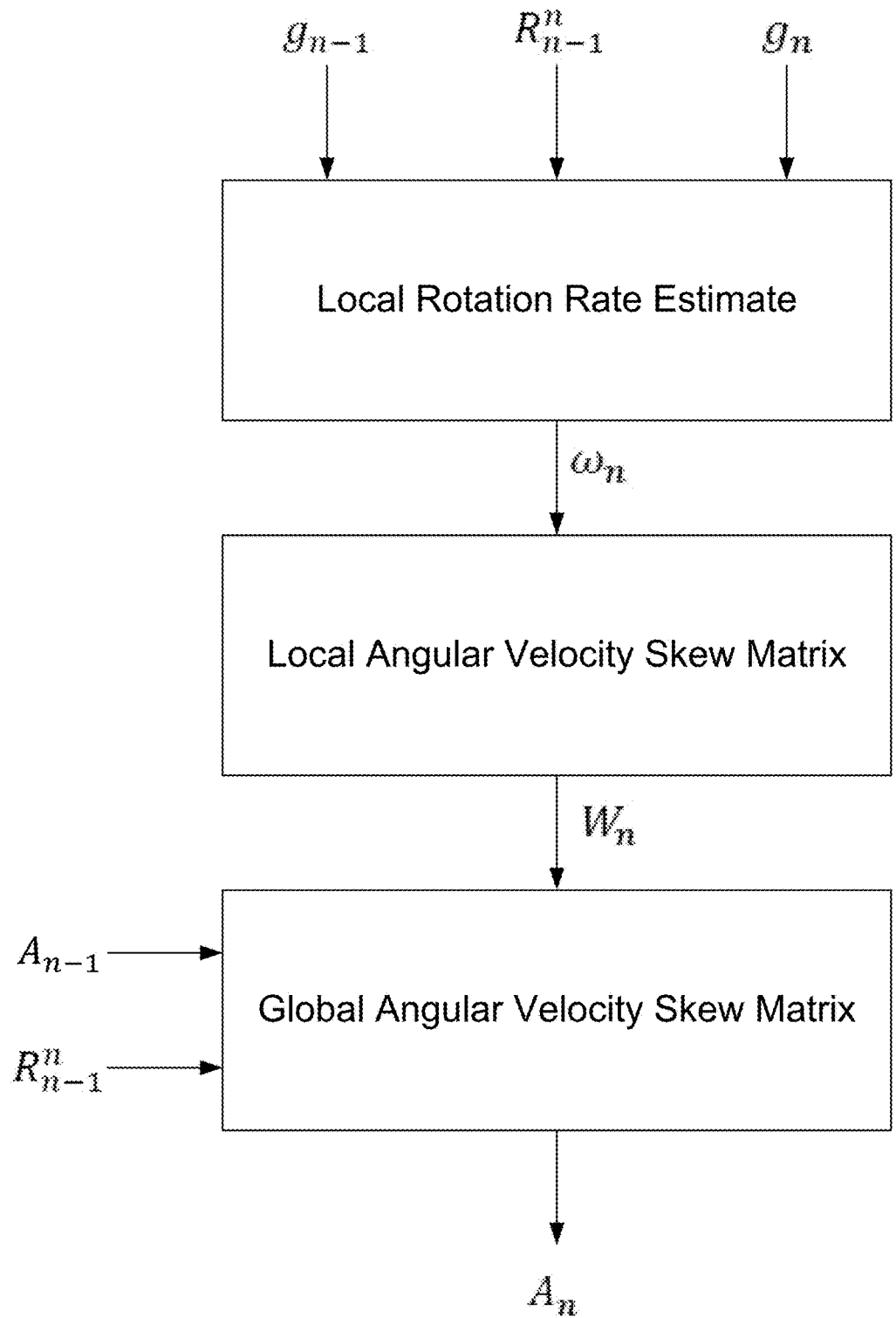
FIG. 6 is a flowchart illustrating a method of determining a global angular velocity skew matrix in accordance with an embodiment.

FIG. 6 is a flowchart illustrating a method of determining a global angular velocity skew matrix ($A_n$) of a rigid body n in accordance with an embodiment. The global angular velocity skew matrix of the rigid body n may be used in Equation (2) to determine the centripetal acceleration of the rigid body n.

As shown in FIG. 6, a local rotation rate estimate ($\omega_n$) may be determined based on (i) an angular velocity of the previous rigid body ($g_{n-1}$); (ii) a matrix for rotation between the previous rigid body and the rigid body n ($R_{n-1}^n$); and (iii) an angular velocity of the rigid body n. In particular embodiments, the relative rotation rate estimate of the rigid body n may be calculated using the following equation:

$$\omega_n = g_n - (R_{n-1}^n)^T g_{n-1} \quad \text{Equation (3)}$$

As shown in FIG. 6, the local rotation rate estimate ($\omega_n$) may be used to determine a local angular velocity skew matrix ($W_n$). In particular embodiments, the local angular velocity skew matrix of the rigid body n may be calculated using the following equation:

$$W_n = \omega_n (\omega_n)^T - (\omega_n)^T \omega_n I_{3\times 3} \quad \text{Equation (4)}$$

The local angular velocity skew matrix ($W_n$) may be used with a global angular velocity skew matrix of the previous rigid body ($A_{n-1}$) and the matrix for rotation between the previous rigid body and the rigid body ($R_{n-1}^n$) to determine the global angular velocity skew matrix ($A_n$) of the rigid body n. In particular embodiments, the global angular velocity skew matrix ($A_n$) of the rigid body n may be calculated using the following equation:

$$A_n = (R_{n-1}^n)^T A_{n-1} R_{n-1}^n + W_n \quad \text{Equation (5)}$$

Figure 7:
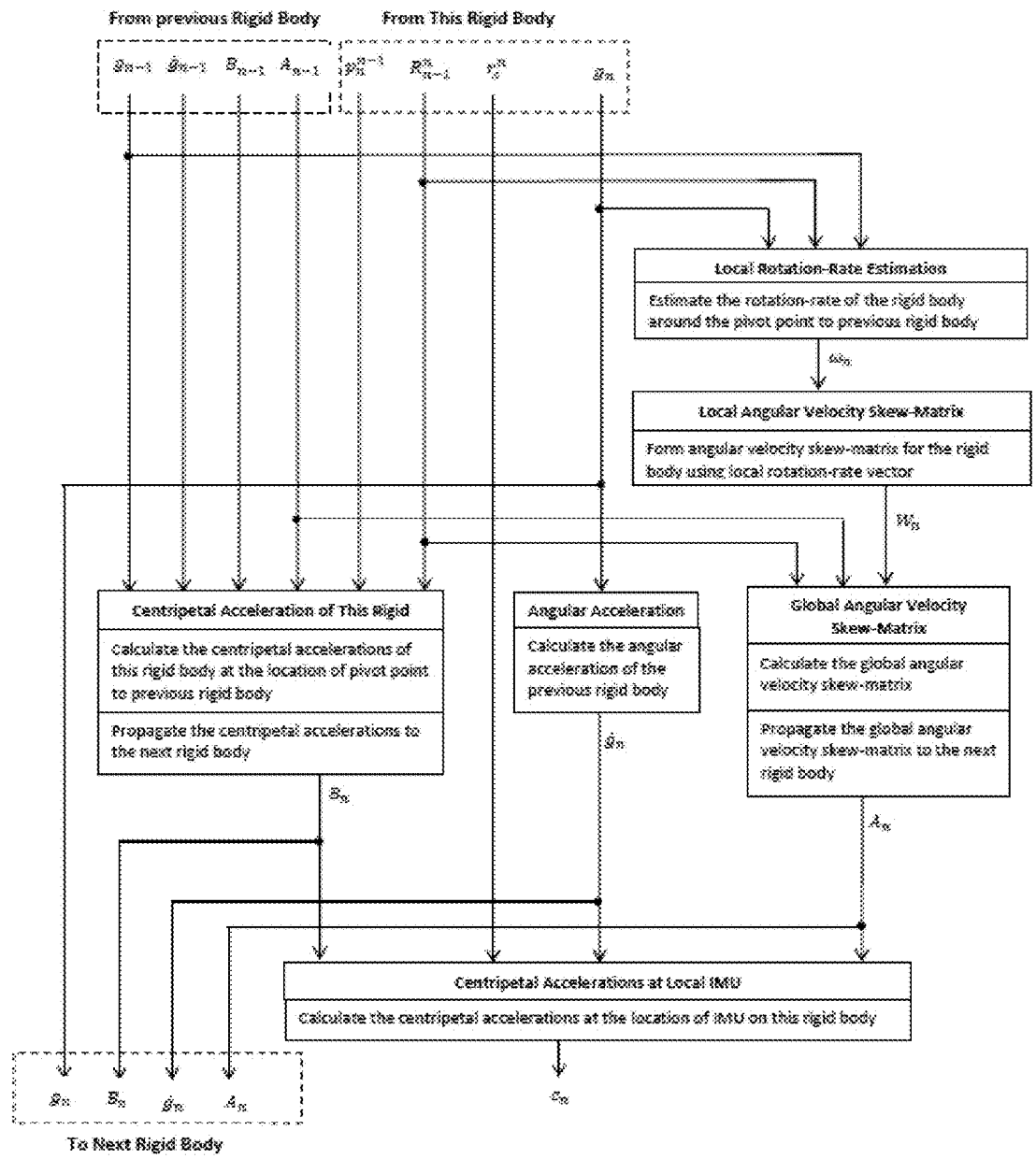
FIG. 7 is a flowchart illustrating a method of determining centripetal acceleration at an IMU in accordance with some embodiments.

FIG. 7 is a flowchart illustrating a method of determining centripetal acceleration ($c_n$) at an $IMU_n$ in accordance with some embodiments. This flowchart shows how the inputs $g_{n-1}$; $\dot{g}_{n-1}$; $B_{n-1}$; $A_{n-1}$; $p_n^{n-1}$; $R_{n-1}^n$; $r_s^n$; and $g_n$ can be used to determine the centripetal acceleration ($c_n$) at the $IMU_n$. This flowchart also shows how the outputs $g_n$; $B_n$; $\dot{g}_n$; and $A_n$ can be passed to a next rigid body for use in determining centripetal acceleration at an IMU that is coupled to the next rigid body. As with other embodiments, this figure shows that the centripetal acceleration at the $IMU_n$ can be determined based on measurements and calculated parameters from the rigid body n and the previous rigid body without requiring information from earlier rigid bodies in the series.

Figure 8:
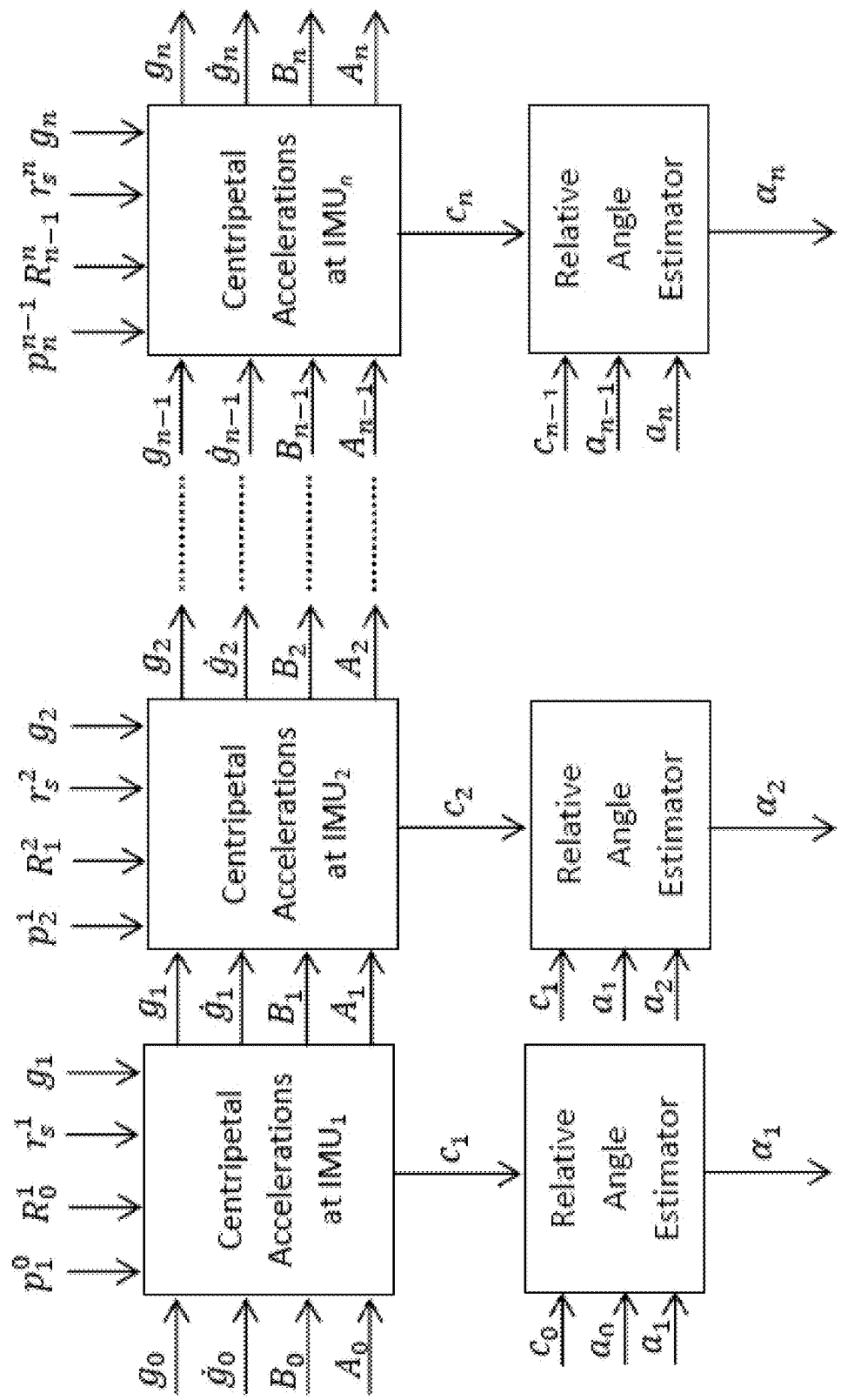
FIG. 8 is a flowchart illustrating methods of determining relative angles between rigid bodies in accordance with some embodiments.

FIG. 8 is a flowchart illustrating methods of determining relative angles between rigid bodies in accordance with some embodiments. This figure is similar to FIG. 3 in that is shows how centripetal accelerations of IMUs can be determined. This figure is different from FIG. 3 in that it also shows how the centripetal accelerations of the IMUs can be used to estimate relative angles between rigid bodies arranged in a series.

In this example, the centripetal acceleration ($c_n$) at an $IMU_n$ that is coupled to a rigid body n is provided to a relative angle estimator. The relative angle estimator may be a separate controller or the same controller used to determine the centripetal accelerations. The relative angle estimator uses the centripetal acceleration ($c_n$) at the $IMU_n$ along with the centripetal acceleration at the previous IMU ($c_{n-1}$), a measured acceleration from the previous IMU ($\alpha_{n-1}$), and a measured acceleration from the $IMU_n$ ($\alpha_n$) to determine a relative angle ($\alpha_n$) between the rigid body n and the previous rigid body. For the excavators shown in FIGS. 1-2, the relative angles between the rigid bodies can be used with conventional techniques to determine a position of the bucket 20 and/or teeth 30.

In particular embodiments, the relative angle ($\alpha_n$) between the rigid body n and the previous rigid body may be calculated using the following equation:

$$\alpha_{n-1} = R_{n-1}^n (\alpha_n - c_n) + c_{n-1} \quad \text{Equation (6)}$$

Figure 9:
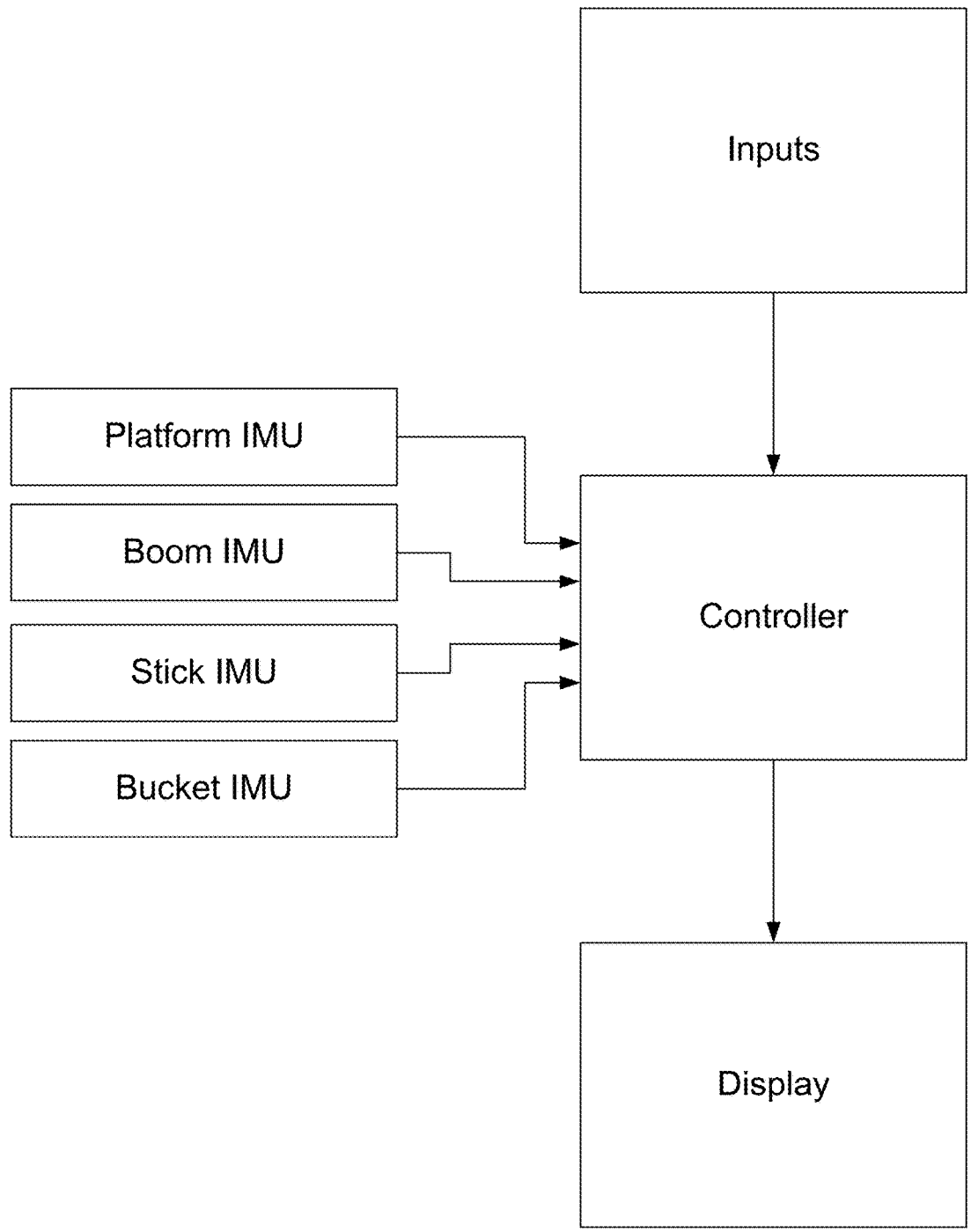
FIG. 9 is a simplified diagram of a control system in accordance with some embodiments.

FIG. 9 is a simplified diagram of a control system in accordance with some embodiments. The system includes a state estimator that may be used with the excavators shown in FIGS. 1-2 (e.g., controller 50). This figure shows how outputs from IMUs associated with a platform, a boom, a stick, and a bucket are passed to the state estimator. The IMUs provide measured accelerations and angular velocities to the state estimator. The state estimator uses the measured values, along with other inputs as described in the various embodiments, to determine centripetal accelerations at the IMUs. In some embodiments, the state estimator may also determine relative angles between the rigid bodies and a position of an implement (e.g., a bucket and/or teeth) as described herein. These values and/or positions may be output on a display to assist an operator.

The state estimator and/or controller typically include familiar software and hardware components. For example, it may include one or more operating systems, processors, local memories for storage, I/O devices, and system buses interconnecting the hardware components. RAM and disk drives are examples of local memory for storage of data and computer programs. Other types of local memories include magnetic storage media, optical storage media, flash or solid state memories, networked storage devices, and the like.

Figure 10:
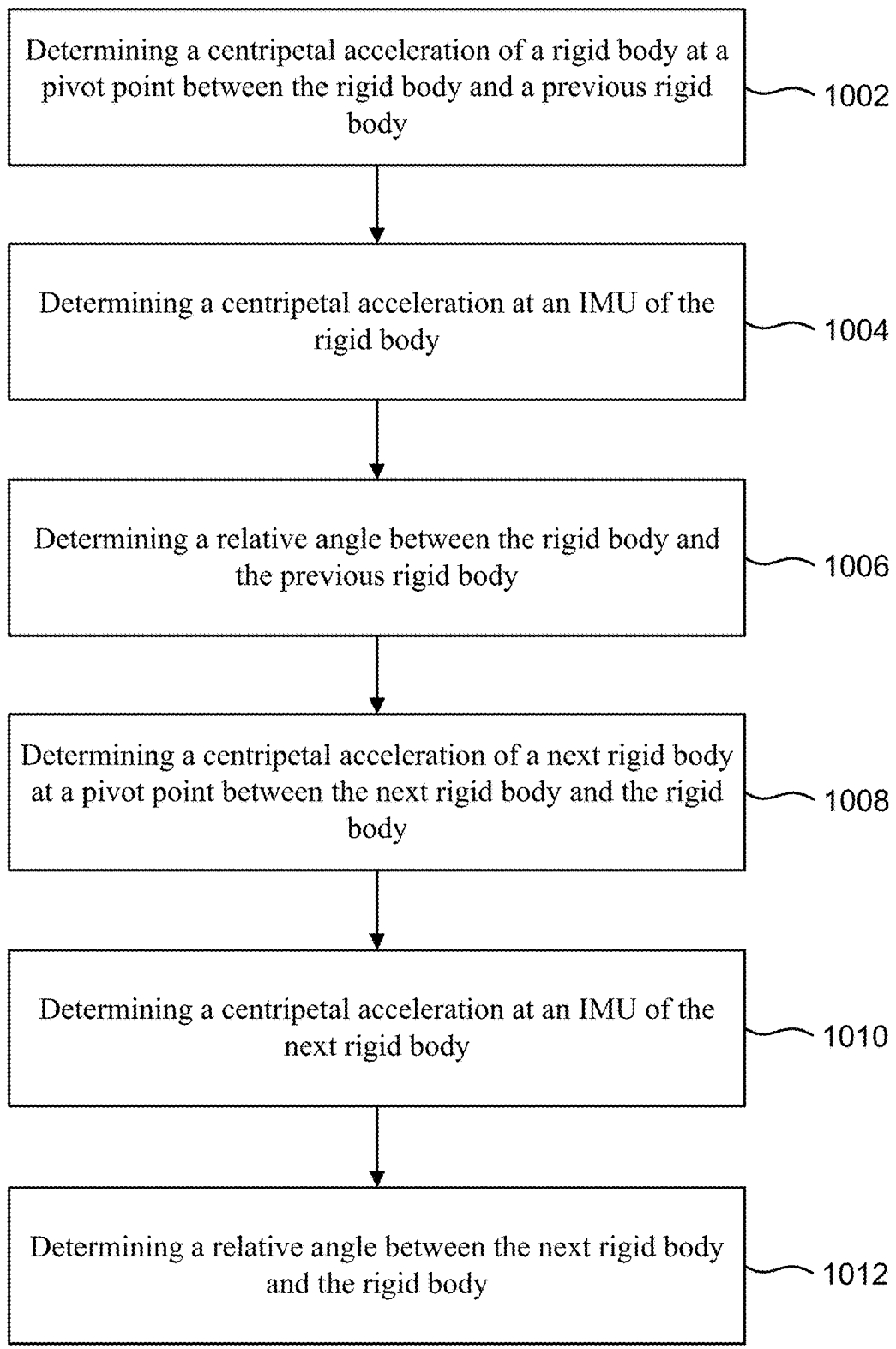
FIG. 10 is a flowchart illustrating a method of compensating for centripetal accelerations of IMUs disposed on separate but coupled rigid bodies in accordance with some embodiments.

FIG. 10 is a flowchart illustrating a method of compensating for centripetal accelerations of IMUs disposed on a kinematic chain, i.e., separate but coupled rigid bodies, in accordance with some embodiments. The rigid bodies may be coupled in a series similar to the rigid bodies of the excavators shown in FIGS. 1-2. The method includes determining a centripetal acceleration of a rigid body at a pivot point between the rigid body and a previous rigid body (1002). The previous rigid body is the immediately prior rigid body in the series. As described previously, the centripetal acceleration of the rigid body may be determined based on an angular velocity of the previous rigid body, an angular acceleration of the previous rigid body, a centripetal acceleration of the previous rigid body, a global angular velocity skew matrix of the previous rigid body, a position of a pivot point between the rigid body and a next rigid body relative to the pivot point between the rigid body and the previous rigid body, and a matrix for rotation between the previous rigid body and the rigid body.

The method also includes determining a centripetal acceleration at an IMU of the rigid body (1004). The IMU is coupled to the rigid body. The centripetal acceleration at the IMU of the rigid body may be determined based on the centripetal acceleration of the rigid body, a location of the IMU on the rigid body, an angular acceleration of the rigid body, and a global angular velocity skew matrix of the rigid body.

The method also includes determining a relative angle between the rigid body and the previous rigid body (1006). The relative angle may be determined based on a measured acceleration at the IMU of the rigid body, the centripetal acceleration at the IMU of the rigid body, a measured acceleration at the IMU of the previous rigid body, and a centripetal acceleration at the IMU of the previous rigid body.

The method also includes determining a centripetal acceleration of a next rigid body at a pivot point between the next rigid body and the rigid body (1008). The next rigid body is the immediately following rigid body in the series. The centripetal acceleration of the next rigid body may be determined based on an angular velocity of the rigid body, an angular acceleration of the rigid body, a centripetal acceleration of the rigid body, a global angular velocity skew matrix of the rigid body, a position of the pivot point between the next rigid body and a following rigid body relative to the pivot point between the next rigid body and the rigid body, and a matrix for rotation between the rigid body and the next rigid body. The following rigid body follows the next rigid body in the series.

The method also includes determining a centripetal acceleration at an IMU of the next rigid body (1010). The IMU is coupled to the next rigid body. The centripetal acceleration at the IMU of the next rigid body may be determined based on the centripetal acceleration of the next rigid body, a location of the IMU on the next rigid body, an angular acceleration of the next rigid body, and a global angular velocity skew matrix of the next rigid body.

The method also includes determining a relative angle between the next rigid body and the rigid body (1012). The relative angle may be determined based on a measured acceleration at the IMU of the next rigid body, the centripetal acceleration at the IMU of the next rigid body, the measured acceleration at the IMU of the rigid body, and the centripetal acceleration at the IMU of the rigid body.

In this example, the centripetal acceleration of the next rigid body and the centripetal acceleration at the IMU of the next rigid body are determined without using measurements or calculated parameters from the previous rigid body as inputs.

FIG. 11 is a flowchart illustrating a method of determining angles between pivotally coupled rigid bodies arranged in a series in accordance with some embodiments. The series includes a rigid body arranged between a previous rigid body and a next rigid body similar to some of the rigid bodies of the excavators shown in FIGS. 1-2. The method includes determining centripetal acceleration of the next rigid body and centripetal acceleration at an IMU coupled to the next rigid body without using measurements or calculated parameters from the previous rigid body (1102).

It should be appreciated that the specific steps illustrated in FIGS. 10-11 provide particular methods according to some embodiments. Other sequences of steps may also be performed according to alternative embodiments. For example, alternative embodiments may perform the steps outlined above in a different order. Moreover, the individual steps illustrated in FIGS. 10-11 may include multiple substeps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method of compensating for centripetal accelerations of inertial measurement units (IMUs) disposed on separate but coupled rigid bodies, the method comprising:

determining a centripetal acceleration of a rigid body at a pivot point between the rigid body and a previous rigid body, the rigid body having an IMU coupled thereto, and the previous rigid body having another IMU coupled thereto, wherein the centripetal acceleration of the rigid body is determined based on:

an angular velocity of the previous rigid body;

an angular acceleration of the previous rigid body;

a centripetal acceleration of the previous rigid body;

a global angular velocity skew matrix of the previous rigid body;

a position of a pivot point between the rigid body and a next rigid body relative to the pivot point between the rigid body and the previous rigid body; and a matrix for rotation between the previous rigid body and the rigid body;

determining a centripetal acceleration at the IMU of the rigid body, wherein the centripetal acceleration at the IMU of the rigid body is determined based on:

the centripetal acceleration of the rigid body;

a location of the IMU on the rigid body;

an angular acceleration of the rigid body; and a global angular velocity skew matrix of the rigid body;

determining a relative angle between the rigid body and the previous rigid body based on a measured acceleration at the IMU of the rigid body, the centripetal acceleration at the IMU of the rigid body, a measured acceleration at the IMU of the previous rigid body, and a centripetal acceleration at the IMU of the previous rigid body;

determining a centripetal acceleration of a next rigid body at a pivot point between the next rigid body and the rigid body, the rigid body arranged between the previous rigid body and the next rigid body, the next rigid body having another IMU coupled thereto, wherein the centripetal acceleration of the next rigid body is determined based on:

an angular velocity of the rigid body;

the angular acceleration of the rigid body;

the centripetal acceleration of the rigid body;

the global angular velocity skew matrix of the rigid body;

a position of the pivot point between the next rigid body and a following rigid body relative to the pivot point between the next rigid body and the rigid body, wherein the following rigid body is after the next rigid body in a series; and a matrix for rotation between the rigid body and the next rigid body;

determining a centripetal acceleration at the IMU of the next rigid body, wherein the centripetal acceleration at the IMU of the next rigid body is determined based on:
the centripetal acceleration of the next rigid body;
a location of the IMU on the next rigid body;
an angular acceleration of the next rigid body; and
a global angular velocity skew matrix of the next rigid body;

determining a relative angle between the next rigid body and the rigid body based on a measured acceleration at the IMU of the next rigid body, the centripetal acceleration at the IMU of the next rigid body, the measured acceleration at the IMU of the rigid body, and the centripetal acceleration at the IMU of the rigid body.

2. The method of claim 1 wherein the centripetal acceleration of the next rigid body and the centripetal acceleration at the IMU of the next rigid body are determined without using the angular velocity of the previous rigid body as an input.

3. The method of claim 1 wherein the centripetal acceleration of the next rigid body and the centripetal acceleration at the IMU of the next rigid body are determined without using measurements from the previous rigid body as inputs.

4. The method of claim 1 wherein the centripetal acceleration of the next rigid body and the centripetal acceleration at the IMU of the next rigid body are determined without using calculated parameters from the previous rigid body as inputs.

5. The method of claim 1 wherein the position of the pivot point between the rigid body and the next rigid body relative to the pivot point between the rigid body and the previous rigid body is a vector extending from the pivot point between the rigid body and the previous rigid body to the pivot point between the rigid body and the next rigid body.

6. The method of claim 1 wherein the location of the IMU on the rigid body is a vector extending from the pivot point between the rigid body and the previous rigid body to the location of the IMU on the rigid body.

7. The method of claim 1 wherein the global angular velocity skew matrix of the rigid body is determined based on the matrix for rotation between the previous rigid body and the rigid body, the global angular velocity skew matrix of the previous rigid body, and a local angular velocity skew matrix of the rigid body.

8. The method of claim 7 wherein the local angular velocity skew matrix of the rigid body is determined based on a rotation rate of the rigid body around the pivot point between the rigid body and the previous rigid body.

9. The method of claim 8 wherein the rotation rate of the rigid body around the pivot point between the rigid body and the previous rigid body is determined based on the angular velocity of rigid body, the matrix for rotation between the previous rigid body and the rigid body, and the angular velocity of the previous rigid body.

10. A method for determining angles between a series of separate but coupled rigid bodies, the method comprising:
determining a centripetal acceleration of a rigid body, the centripetal acceleration of the rigid body based in part on an angular velocity of a previous rigid body, the previous rigid body being pivotally coupled to the rigid body;
determining a centripetal acceleration at an inertial measurement unit (IMU) coupled to the rigid body, the centripetal acceleration at the IMU based in part on the centripetal acceleration of the rigid body;

determining a relative angle between the rigid body and the previous rigid body based on a measured acceleration at the IMU, the centripetal acceleration at the IMU, a measured acceleration at an IMU coupled to the previous rigid body, and a centripetal acceleration at the IMU coupled to the previous rigid body;

determining a centripetal acceleration of a next rigid body, the centripetal acceleration of the next rigid body based in part on an angular velocity of the rigid body, the rigid body being pivotally coupled to the next rigid body;

determining a centripetal acceleration at a next IMU coupled to the next rigid body, the centripetal acceleration at the next IMU based in part on the centripetal acceleration of the next rigid body, wherein the centripetal acceleration of the next rigid body and the centripetal acceleration at the next IMU are determined without using the angular velocity of the previous rigid body as an input; and determining a relative angle between the next rigid body and the rigid body based on a measured acceleration at the next IMU, the centripetal acceleration at the next IMU, a measured acceleration at the IMU coupled to the rigid body, and the centripetal acceleration at the IMU coupled to the rigid body.

11. The method of claim 10 wherein the centripetal acceleration of the next rigid body and the centripetal acceleration at the next IMU are determined without using measurements from the previous rigid body as inputs.

12. The method of claim 10 wherein the centripetal acceleration of the next rigid body and the centripetal acceleration at the next IMU are determined without using calculated parameters from the previous rigid body as inputs.

13. The method of claim 10 wherein the centripetal acceleration of the next rigid body is also based on an angular acceleration of the rigid body, the centripetal acceleration of the rigid body, a global angular velocity skew matrix of the rigid body, a position of the pivot point between the next rigid body and a following rigid body relative to the pivot point between the next rigid body and the rigid body, and a matrix for rotation between the rigid body and the next rigid body.

14. The method of claim 10 wherein the centripetal acceleration at the next IMU coupled to the next rigid body is also based on the centripetal acceleration of the next rigid body, a location of the next IMU on the next rigid body, an angular acceleration of the next rigid body, and a global angular velocity skew matrix of the next rigid body.

15. A method for determining centripetal accelerations of pivotally coupled rigid bodies arranged in a series, the series including a rigid body arranged between a previous rigid body and a next rigid body, the method comprising:
determining the centripetal acceleration of the next rigid body and the centripetal acceleration at an inertial measurement unit (IMU) coupled to the next rigid body based on measurements and calculated parameters from the rigid body and the next rigid body, wherein the centripetal acceleration of the next rigid body and the centripetal acceleration at the IMU coupled to the next rigid body are determined without using measurements or calculated parameters from the previous rigid body.

16. The method of claim 15 wherein the centripetal acceleration of the next rigid body is determined based on an angular velocity of the rigid body, an angular acceleration of the rigid body, a centripetal acceleration of the rigid body, a global angular velocity skew matrix of the rigid body, a position of the pivot point between the next rigid body and a following rigid body relative to the pivot point between the next rigid body and the rigid body, and a matrix for rotation between the rigid body and the next rigid body.

17. The method of claim 15 wherein the centripetal acceleration at the IMU coupled to the next rigid body is determined based on the centripetal acceleration of the next rigid body, a location of the IMU on the next rigid body, an angular acceleration of the next rigid body, and a global angular velocity skew matrix of the next rigid body.

18. The method of claim 15 further comprising determining a relative angle between the next rigid body and the rigid body based at least in part of the centripetal acceleration at the next IMU.

19. The method of claim 15 further comprising determining the centripetal acceleration of the rigid body and the centripetal acceleration at an IMU coupled to the rigid body based on measurements and calculated parameters from the previous rigid body and the rigid body, wherein the centripetal acceleration of the rigid body and the centripetal acceleration at the IMU coupled to the rigid body are determined without using measurements or calculated parameters from rigid bodies before the previous rigid body in the series.

20. A method for determining angles between pivotally coupled rigid bodies arranged in a series, the series including a rigid body arranged between a previous rigid body and a next rigid body, the method comprising:
- determining a centripetal acceleration of the rigid body and a centripetal acceleration at an inertial measurement unit (IMU) coupled to the rigid body;
- determining a relative angle between the rigid body and the previous rigid body based on a measured acceleration at the IMU, the centripetal acceleration at the IMU, a measured acceleration at an IMU coupled to the previous rigid body, and a centripetal acceleration at the IMU coupled to the previous rigid body;
- determining the centripetal acceleration of the next rigid body and the centripetal acceleration at an IMU coupled to the next rigid body according to the method recited by claim 15, and
- determining a relative angle between the next rigid body and the rigid body based on a measured acceleration at the IMU coupled to the next rigid body, the centripetal acceleration at the IMU coupled to the next rigid body, a measured acceleration at the IMU coupled to the rigid body, and a centripetal acceleration at the IMU coupled to the rigid body.

* * * * *